United States Patent
Matsuo

(10) Patent No.: US 11,462,014 B2
(45) Date of Patent: Oct. 4, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Yoshihisa Matsuo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/060,639

(22) Filed: Oct. 1, 2020

(65) Prior Publication Data
US 2021/0287003 A1   Sep. 16, 2021

(30) Foreign Application Priority Data
Mar. 16, 2020   (JP) .............................. JP2020-045701

(51) Int. Cl.
| | |
|---|---|
| G06V 20/20 | (2022.01) |
| H04N 5/232 | (2006.01) |
| H04N 5/262 | (2006.01) |
| G06V 10/40 | (2022.01) |
| G06V 10/98 | (2022.01) |
| G06V 30/412 | (2022.01) |

(52) U.S. Cl.
CPC .............. *G06V 20/20* (2022.01); *G06V 10/40* (2022.01); *G06V 10/993* (2022.01); *H04N 5/23222* (2013.01); *H04N 5/2628* (2013.01); *G06V 30/412* (2022.01)

(58) Field of Classification Search
CPC ... G06V 10/40; H04N 5/23222; H04N 5/2628
See application file for complete search history.

(56) References Cited

U.S. PATENT DOCUMENTS

2010/0189365 A1 * 7/2010 Kanekiyo ........... G06F 16/5838
382/209

FOREIGN PATENT DOCUMENTS

JP    2017-117027 A    6/2017

* cited by examiner

*Primary Examiner* — Ahmed A Berhan
(74) *Attorney, Agent, or Firm* — Oliff PLC

(57) ABSTRACT

An information processing apparatus includes a processor configured to, when extracting character information for search information corresponding to a type of a target from an image obtained by photographing the target, receive type information indicating the type of the target, and output first guidance information for providing a guidance to acquire a first image including at least search information associated with the type information and a vicinity of the search information.

20 Claims, 10 Drawing Sheets

FIG. 3

| JOB NAME | DOCUMENT TYPE | ATTRIBUTE 1 | ATTRIBUTE 2 | ... | ATTRIBUTE n |
|---|---|---|---|---|---|
| | | COMPANY NAME | ISSUE DATE | AMOUNT | |
| JOB A | QUOTATION | | | | |
| JOB B | CONTRACT | | | | |
| JOB C | INVOICE | | | | |
| JOB D | PURCHASE ORDER | | | | |
| ... | ... | | | | |

144

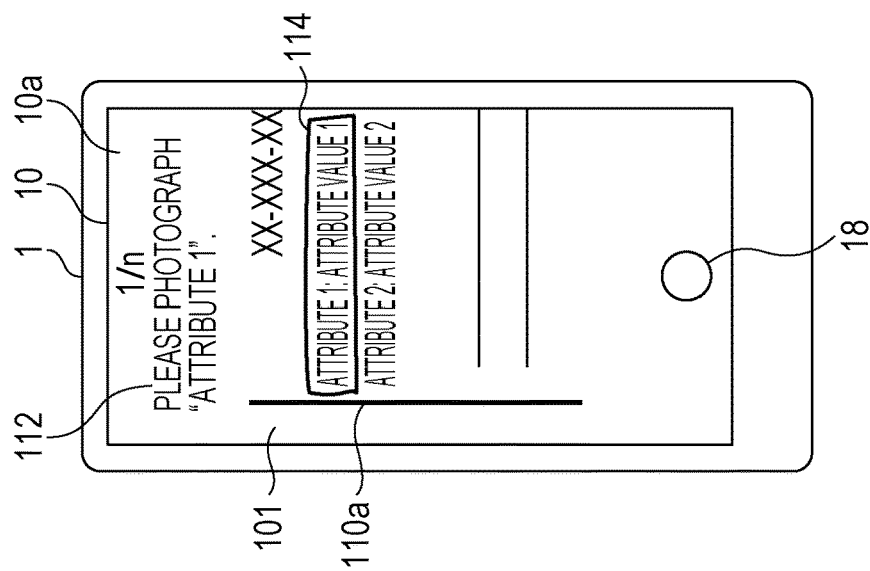
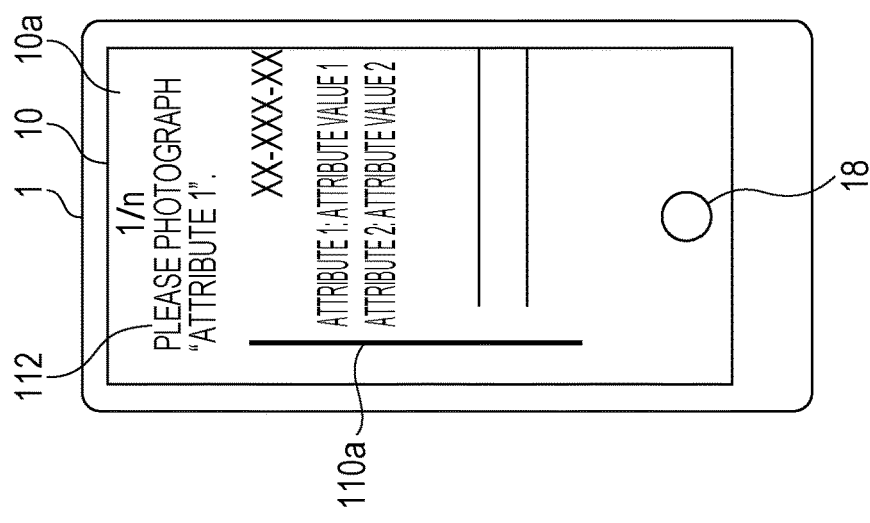
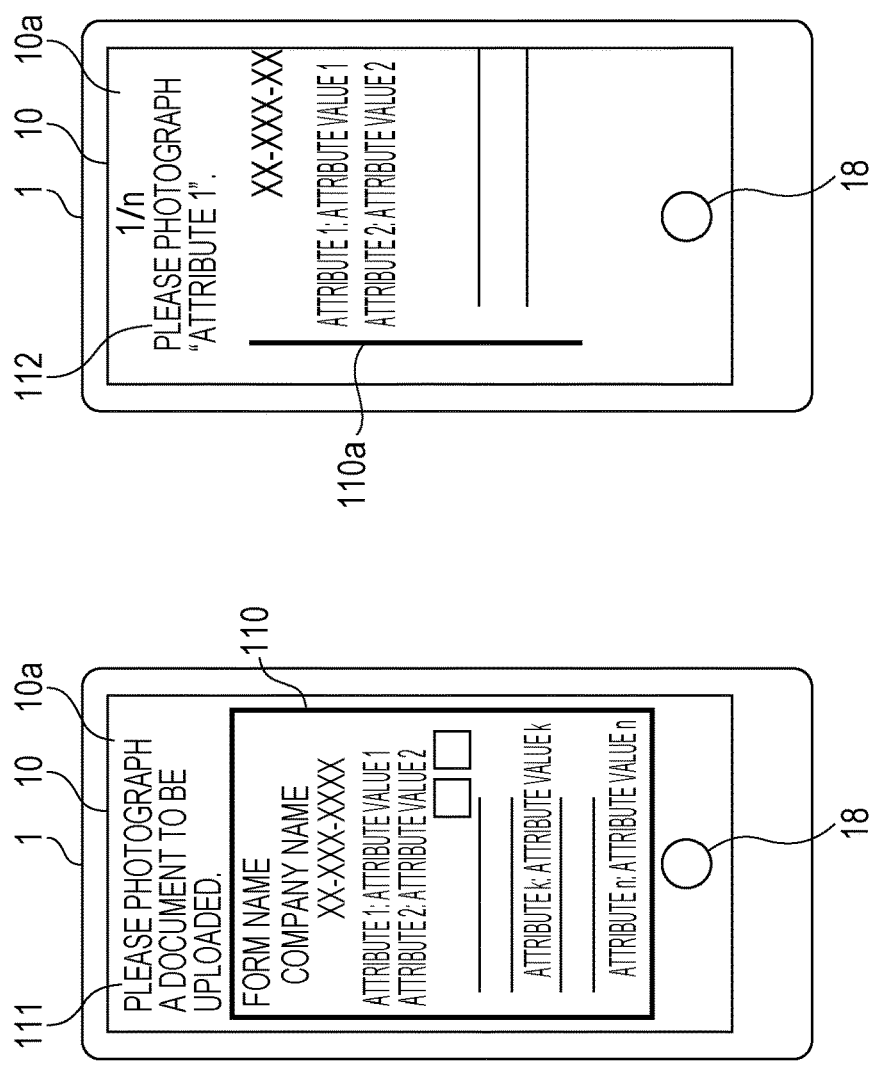

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-045701 filed Mar. 16, 2020.

BACKGROUND

(i) Technical Field

The present disclosure relates to an information processing apparatus and a non-transitory computer readable medium.

(ii) Related Art

As methods for recognizing characters written in a form, form definition and key-value extraction have been known. In a key-value extraction technique, character information in the vicinity of a predetermined keyword may be acquired as a value. The key-value extraction technique also supports irregular forms (see, for example, Japanese Unexamined Patent Application Publication No. 2017-117027).

An information processing apparatus described in Japanese Unexamined Patent Application Publication No. 2017-117027 performs block section of images obtained by sequential shooting with a camera, performs optical character recognition (OCR) of only an object in the vicinity of the center of photographing, and determines whether or not there is text that corresponds to a specific keyword received by an input unit. In the case where there is text corresponding to the specific keyword, the information processing apparatus highlights, in a first method, a region corresponding to an image on which OCR has been performed, highlights, in a second method, a region corresponding to an image that is determined to be text as a result of OCR on an object in the vicinity of the region corresponding to the image on which OCR has been performed, and displays a trigger button for stopping sequential shooting. Furthermore, the information processing apparatus determines whether or not a part highlighted in the second method has been selected. In the case where a prat highlighted in the second method has been selected, the information processing apparatus captures text in the selected part as necessary information.

SUMMARY

In the case where an image contains a plurality of pieces of search information, it is unclear near which search information character information as a value is to be acquired from. Thus, accuracy in extraction of character information may be degraded.

Aspects of non-limiting embodiments of the present disclosure relate to providing an information processing apparatus and a non-transitory computer readable medium that are able to acquire an appropriate image for performing processing for extracting character information for search information corresponding to the type of a target from an image obtained by photographing the target, compared to a configuration in which a user is not guided to acquire a first image including the search information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to, when extracting character information for search information corresponding to a type of a target from an image obtained by photographing the target, receive type information indicating the type of the target, and output first guidance information for providing a guidance to acquire a first image including at least search information associated with the type information and a vicinity of the search information.

BRIEF DESCRIPTION OF THE DRAWINGS

Exemplary embodiments of the present disclosure will be described in detail based on the following figures, wherein:

FIG. 3 is a diagram illustrating an example of a document type information table;

FIGS. 6A to 6C are diagrams illustrating an example of an operation of the information processing apparatus;

DETAILED DESCRIPTION

Hereinafter, exemplary embodiments of the present disclosure will be described with reference to drawings. Component elements having substantially the same function will be referred to with the same reference signs throughout the drawings, and redundant explanation will not be provided.

Summary of Exemplary Embodiments

An information processing apparatus according to an exemplary embodiment includes a processor configured to, when extracting character information for search information corresponding to a type of a target from an image obtained by photographing the target, receive type information indicating the type of the target, and output first guidance information for providing a guidance to acquire a first image including at least search information associated with the type information and a vicinity of the search information.

For example, a document such as a form corresponds to the "target". The "search information" represents information such as a character string to be searched for in the document. The "search information" may be, for example, the name of an item written in the document. The "character information" represents a value extracted in accordance with the search information.

The "type of a target" may be, for example, a form, an application form, a quotation, a contract, an invoice, a purchase order, specifications, or the like.

The "first image" represents an image obtained by photographing a target and including at least search information and a vicinity of the search information. As a method for acquiring a first image, for example, a method for photographing search information and a vicinity of the search information, a method for cutting out and extracting search information and a vicinity of the search information from an image, a method for determining search information and a vicinity of the search information from an image, or the like may be used. Furthermore, as an operation for specifying search information and a vicinity of the search information, for example, an operation for enlarging an image or a marking operation may be performed.

The first guidance information represents information for guiding a user to acquire a first image. The first guidance information may be, for example, information for guiding a user to issue an instruction to photograph a first image, information for guiding a user to enlarge an image to include search information and display the enlarged image, information for guiding a user to attach a mark to a region including search information, or the like.

Exemplary Embodiments

Figure 1:
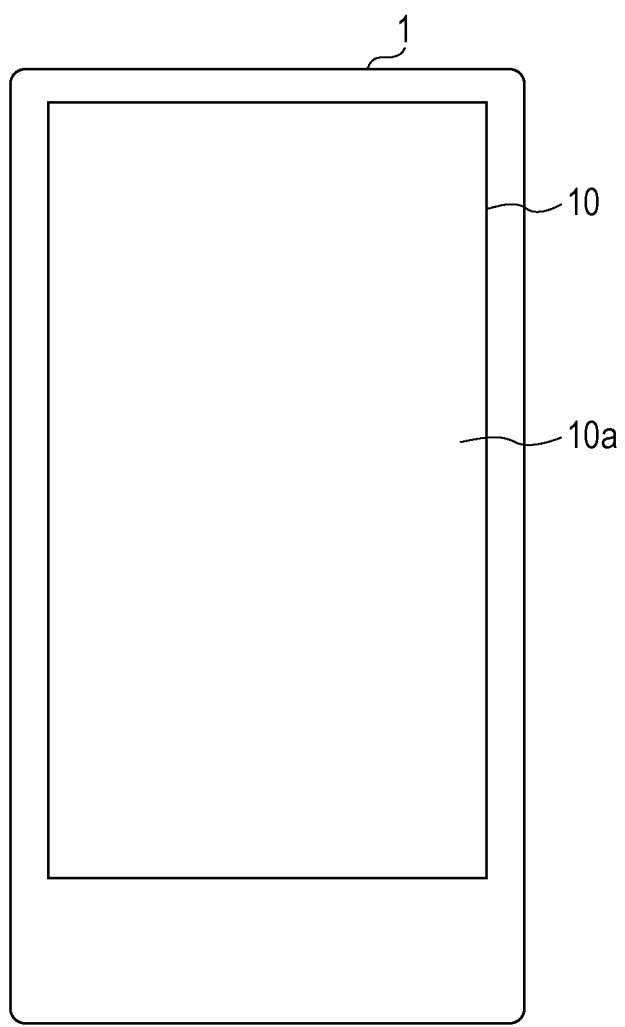
FIG. 1 is a block diagram illustrating a schematic configuration of an information processing apparatus according to an exemplary embodiment of the present disclosure.

FIG. 1 is a diagram illustrating a schematic configuration of an information processing apparatus according to an exemplary embodiment of the present disclosure. An information processing apparatus 1 is, for example, a personal computer, a tablet terminal, or a portable information terminal such as a multifunction mobile phone. As illustrated in FIG. 1, the information processing apparatus 1 includes an operation display unit 10 that inputs and displays information. The operation display unit 10 includes a display surface 10a on which a display target is displayed.

The operation display unit 10 is, for example, a touch panel display. The operation display unit 10 has a configuration in which a touch panel is superimposed on a display such as a liquid crystal display.

Figure 2:
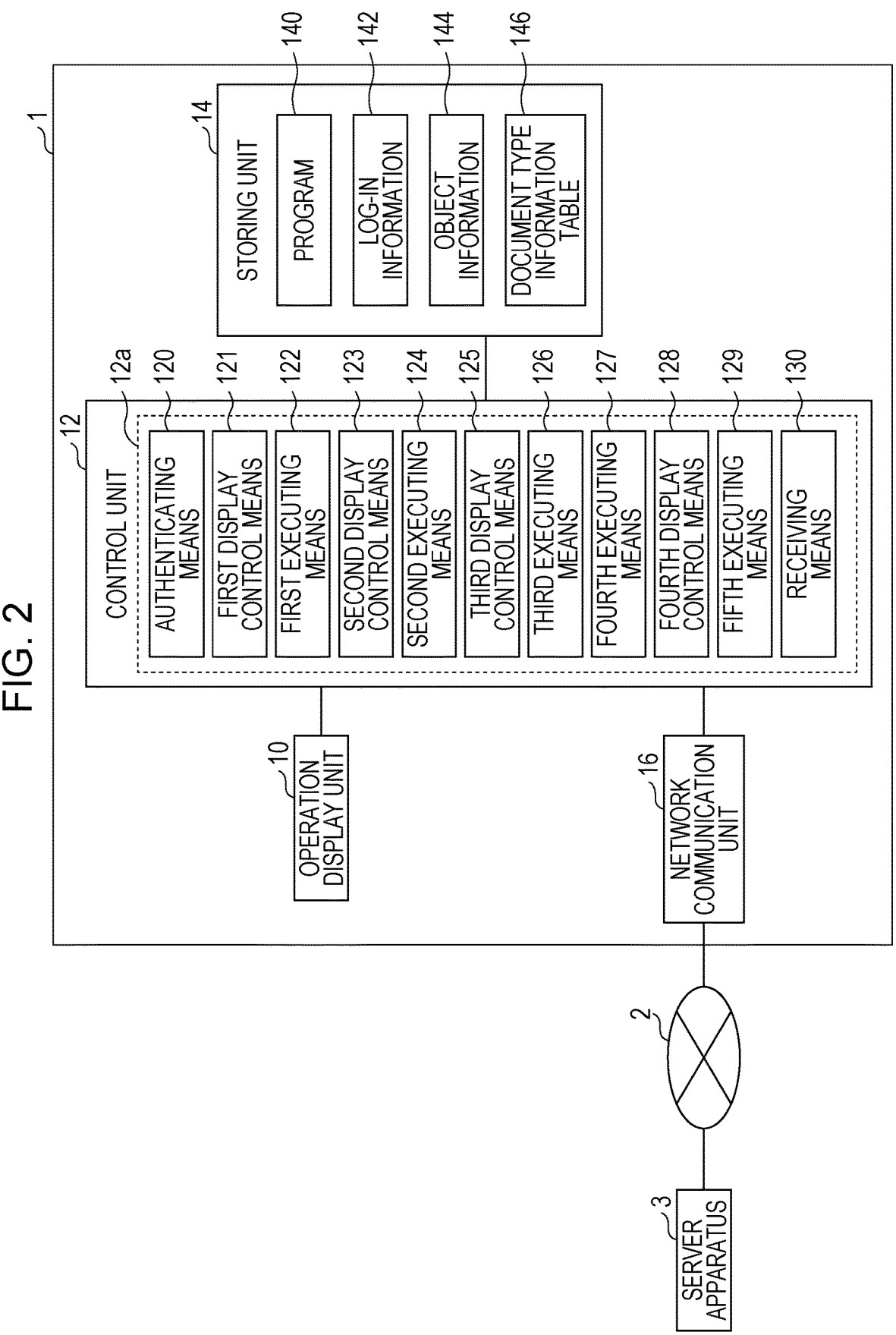
FIG. 2 is a block diagram illustrating an example of a control system of the information processing apparatus illustrated in FIG. 1.

FIG. 2 is a block diagram illustrating an example of a control system of the information processing apparatus 1 illustrated in FIG. 1. The information processing apparatus 1 further includes, in addition to the operation display unit 10 described above, a control unit 12 that controls individual units of the information processing apparatus 1, a storing unit 14 that stores various data, and a network communication unit 16 that communicates with an external apparatus such as a server apparatus 3 via a network 2.

The control unit 12 includes a processor 12a such as a central processing unit (CPU), an interface, and the like. The processor 12a functions as authenticating means 120, first display control means 121, first executing means 122, second display control means 123, second executing means 124, third display control means 125, third executing means 126, fourth executing means 127, fourth display control means 128, fifth executing means 129, receiving means 130, and the like when the processor 12a operates in accordance with a program 140 stored in the storing unit 14. Details of the authenticating means 120, the first display control means 121, the first executing means 122, the second display control means 123, the second executing means 124, the third display control means 125, the third executing means 126, the fourth executing means 127, the fourth display control means 128, the fifth executing means 129, and the receiving means 130 will be described later.

The storing unit 14 includes a read only memory (ROM), a random access memory (RAM), a hard disk, and the like. The program 140 and various data including log-in information 142 and a document type information table 146 (see FIG. 3) are stored in the storing unit 14. The details of the document type information table 146 will be described later.

The log-in information 142 represents information for performing authentication of a user and includes, for example, information such as the name of the user or a user ID for identifying the user, information such as a password to be verified when authentication, and the like.

Object information 144 represents information in which a user, an object that may be used by the user (details will be described later, see FIG. 4A), and an icon 100a for the object (see FIG. 4A) are recorded in association with one another.

The network communication unit 16 is implemented by a network interface card (NIC) or the like and transmits and receives a signal to and from an external apparatus such as the server apparatus 3 via the network 2.

(Configuration of Table)

FIG. 3 is a diagram illustrating an example of the document type information table 146. The document type information table 146 is information in which the type of a document to be processed and attributes included in the document are recorded in association with each object. A document is an example of the target.

The document type information table 146 includes a "job name" column, a "document type" column, an "attribute" column (see "attribute 1", "attribute 2", . . . , and "attribute n"). In the "job name" column, information indicating the name of an object, such as "job A" or "job B", is recorded.

In the "document type" column, information indicating the type of a document is recorded. Such information is an example of the document type information. The document type is, for example, a form, an application form, a quotation, a contract, an invoice, a purchase order, specifications, or the like. Documents include, for example, information recorded on a medium such as paper and information electronically recorded and created using an application such as a document creation program, a diagram creation program, a spreadsheet program, or a document management program.

Information indicating items included in various documents (hereinafter, may be referred to as "attributes") is recorded in the "attribute k" columns (k=1, 2, . . . , and n). An item represents a name assigned to character information (hereinafter, may be simply referred to as an "attribute value") including characters or a numerical value written individually in a document. The items include, for example, a company name, an issue date, the amount of money, and the like. The number of items may vary according to the type of document. An item is an example of search information.

(Means Included in Controller)

Next, the means included in the control unit 12 will be described. The authenticating means 120 performs authentication of a user by comparing a user ID and a password input when logging in with the log-in information 142 stored in the storing unit 14.

FIGS. 4A, 4B, 4C, and 4D are diagrams illustrating an example of an operation of the information processing apparatus 1 illustrated in FIG. 1. The operation is performed in the order of FIG. 4A, FIG. 4B, FIG. 4C, and FIG. 4D. Details of the first, second, third, and fourth display control means 121, 123, 125, and 128 and the first, second, third, fourth, and fifth executing means 122, 124, 126, 127, and 129 will be described with reference to FIGS. 4A to 4D.

Figure 4D:
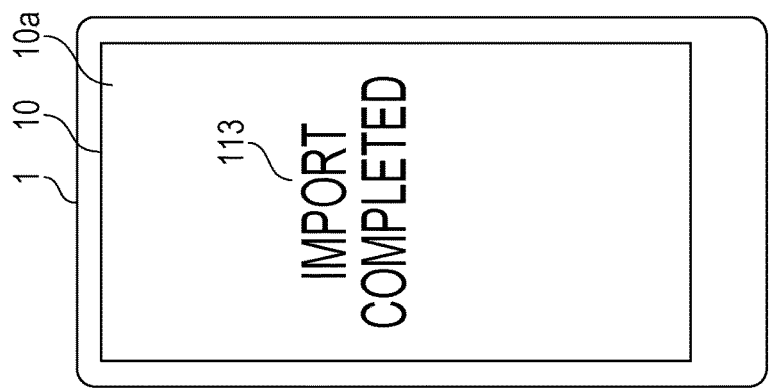
FIGS. 4A to 4D are diagrams illustrating an example of an operation of the information processing apparatus illustrated in FIG. 1.
Figure 4C:
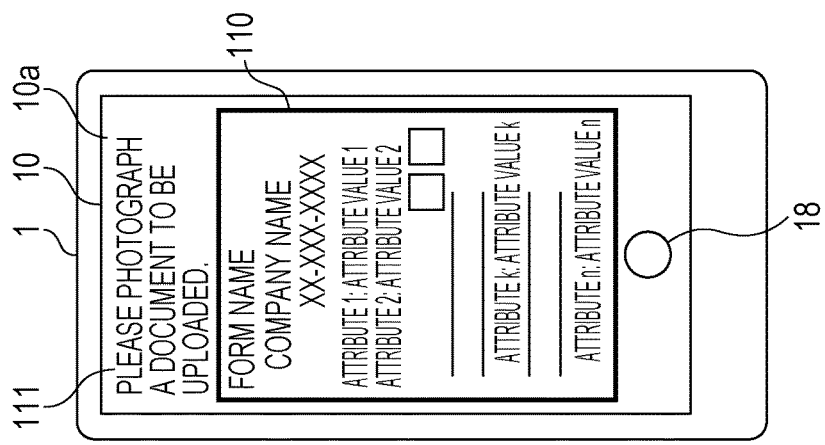
Figure 4B:
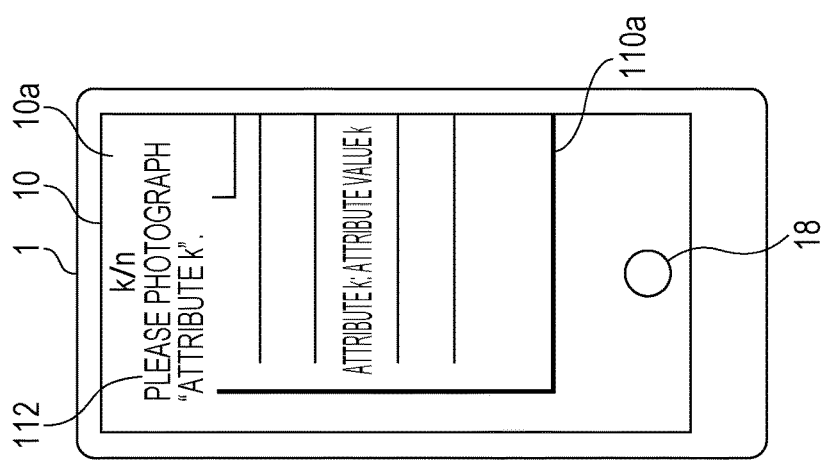
Figure 4A:
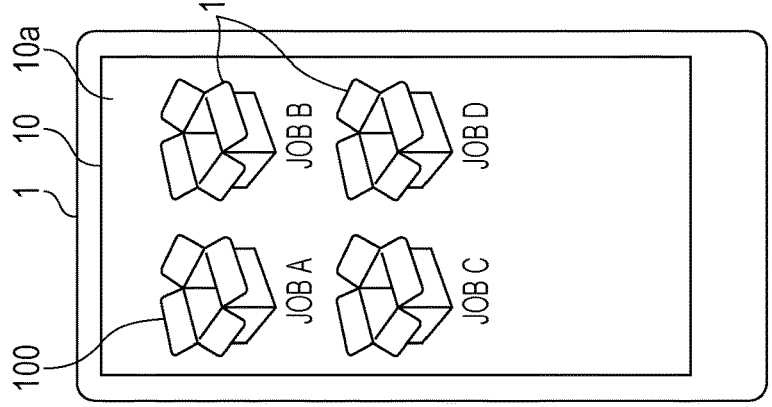

As illustrated in FIG. 4A, the first display control means 121 performs control such that a top screen 100 as a first screen is displayed on the display surface 10a. On the top screen 100, icons 100a each including a workflow (hereinafter, may be referred to as an "object") defining a series of operations performed in a job are displayed.

Specifically, the first display control means 121 refers to the object information 144 stored in the storing unit 14 to identify objects that may be used by a user who has logged in and acquire the list of corresponding icons 100a. Then, the first display control means 121 performs control such that the acquired list of icons 100a is displayed on the top screen 100.

In other words, an object defines contents of a job and includes a function for starting execution of the job. For example, an object defines contents of a job by including information indicating the type of a document to be processed, contents of the process, and a destination for execution of the process (for example, a destination to which the document is to be transmitted).

Contents of the process include, for example, operations such as provision, notification, and storing of an attribute value. The destination for execution includes, for example, an organization or the like to which a document is to be transmitted. The object is defined as, for example, "notification of a quotation by company A", "provision of an attribute value to an invoice", or "storing of a quotation by company B".

In this example, the icons 100a will be explained using, for example, images of boxes. However, each of the icons 100a may be configured such that characters or a sign is added to a diagram representing contents of an object or a human image or the like associated with the object or may be represented simply by characters or a sign.

When an operation for selecting an icon 100a displayed on the top screen 100 is performed, the first executing means 122 refers to the document type information table 146 stored in the storing unit 14 and acquires an attribute associated with an object corresponding to the selected icon 100a. The operation for selecting an icon 100a includes, for example, an operation for pressing the icon 100a.

As illustrated in FIG. 4B, the second display control means 123 performs control such that a screen (hereinafter, may be referred to as a "photographing screen") for photographing a document 110 is displayed on the display surface 10a. The second display control means 123 also causes the image of the entire document 110 to be displayed as a photographing target on the display surface 10a. The image of the entire document 110 is an example of a target image.

The "entire" represents a region including substantially all the various types of information recorded in the document 110. The "entire" does not necessarily represent the whole region including edge parts of paper or electronic data but may be, for example, a region from which part of edge parts has been cut off, a region on which image processing has been performed such that part of edge parts is removed, or a region photographed without including part of edge parts.

Furthermore, the second display control means 123 performs control such that a photographing button 18 for issuing an instruction to perform photographing is displayed. The second display control means 123 also performs control such that information (hereinafter, referred to as "first guidance information") for guiding a user to photograph the document 110 is displayed. "Displaying" is an aspect of outputting. The guidance information is not necessarily displayed. For example, the guidance information may be output as sound. Hereinafter, similar explanation may be omitted.

When an operation for issuing an instruction to perform photographing is performed, the second executing means 124 photographs the document 110 that is caused by the second display control means 123 to be displayed on the display surface 10a. The operation for issuing an instruction to perform photographing includes, for example, an operation for pressing the photographing button 18.

As illustrated in FIG. 4C, the third display control means 125 performs control such that an attribute acquired by the first executing means 122 is displayed. Specifically, the third display control means 125 performs control such that information (hereinafter, may be referred to as "second guidance information") 112 including the attribute as a character string, such as "Please photograph 'attribute k'.", and guiding the user to issue an instruction to perform photographing of a region in the vicinity of the "attribute k" is displayed. The guidance such as "Please photograph 'attribute k'." implicitly guides the user to photograph "attribute k and attribute value k". As long as the user is able to understand that the user is guided to photograph the attribute k and a vicinity of the attribute k (that is, the attribute value k), the guidance is not limited to the expression mentioned above. Photographing is an example of "acquisition" in an exemplary embodiment of the present disclosure. The second guidance information is an example of "first guidance information" in an exemplary embodiment of the present disclosure.

Furthermore, in the case where n attributes are acquired by the first executing means 122, the third display control means 125 may perform control such that the guidance information is displayed such that information indicating the order of an attribute in the whole attributes (n attributes) is added to the attribute (see a character string "k/n" in FIG. 4C).

Furthermore, the third display control means 125 performs control such that a photographing screen for photographing a first image 110a obtained by enlarging part of the document 110 to include the corresponding attribute and the attribute value (that is, character information specifically indicating the date, the amount of money, etc.) corresponding to the attribute is displayed.

The third display control means 125 also performs control such that the first image 110a is displayed on the display surface 10a. The first image 110a is an image including a region in the vicinity of the attribute. The "vicinity" represents a region including the attribute and a predetermined range surrounding the attribute.

In FIG. 4C, an example of the first image 110a obtained by enlarging part of the document 110 to include an attribute k, which is the k-th attribute, and an attribute value k corresponding to the attribute k and photographing the enlarged part is illustrated.

When the operation for issuing an instruction to perform photographing is performed, the third executing means 126 photographs the first image 110*a* displayed on the display surface 10*a*.

In the case where the first executing means 122 acquires a plurality of attributes, that is, in the case where there are a plurality of attributes associated with the object corresponding to the icon 100*a* selected on the top screen 100, the fourth executing means 127 controls the third display control means 125 and the third executing means 126 to display the second guidance information including the attribute and photograph the first image 110*a* including the attribute and the attribute value repeatedly in order from the first to n-th attributes.

As illustrated in FIG. 4D, the fourth display control means 128 performs control such that information (see a character string "Import completed" in FIG. 4D) 113 indicating that photographing of the attribute associated with the object corresponding to the icon 100*a* selected on the top screen 100 is completed is displayed.

The fifth executing means 129 registers (hereinafter, may be referred to as "uploads") the images photographed by the second executing means 124 and the third executing means 126 in the server apparatus 3.

The receiving means 130 receives various operations performed by the user on the operation display unit 10. Specifically, the receiving means 130 receives, for example, an operation for requesting logging in (hereinafter, may be referred to as a "log-in operation"), an operation for selecting the icon 100*a*, an operation for enlarging an image displayed on the display surface 10*a*, an operation for attaching a mark to an image displayed on the display surface 10*a* (hereinafter, may be referred to as a "marking operation"), and an operation for issuing an instruction to perform photographing.

(Server Apparatus)

The server apparatus 3 performs image processing for analyzing an uploaded image and extracting an attribute and records the extracted attribute into a database (not illustrated in FIG. 2). The processing for analyzing an image is not necessarily performed by the server apparatus 3 and may be performed by the information processing apparatus 1.

(Operation in Exemplary Embodiment)

Figure 5:
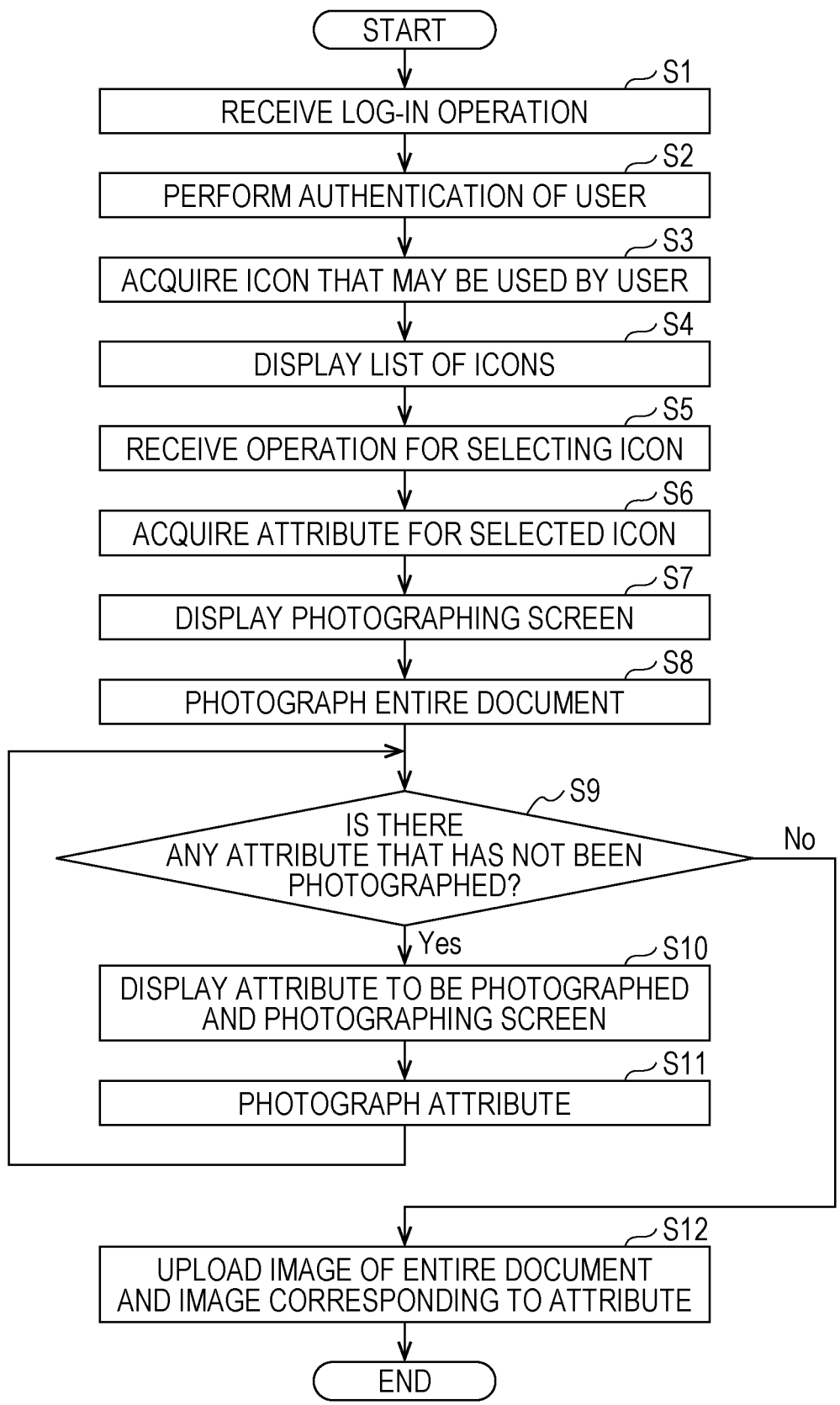
FIG. 5 is a flowchart illustrating an example of the operation of the information processing apparatus illustrated in FIG. 1.

FIG. 5 is a flowchart illustrating an example of an operation of the information processing apparatus 1 illustrated in FIG. 1. When the receiving means 130 receives a log-in operation performed by the user (S1), the authenticating means 120 refers to the log-in information 142 to perform authentication of the user (S2).

The first display control means 121 refers to the object information 144 to identify an object that may be used by the user and acquire the list of corresponding icons 100*a* (S3). The first display control means 121 performs control such that the list of icons 100*a* is displayed on the top screen 100 (S4).

The receiving means 130 receives an operation by the user for selecting an icon 100*a* (S5), and the first executing means 122 refers to the document type information table 146 to acquire an attribute associated with the object corresponding to the selected icon 100*a* (hereinafter, may be referred to as an "attribute for an icon") (S6).

Next, the second display control means 123 performs control such that a photographing screen is displayed on the display surface 10*a* (S7). When the receiving means 130 receives an operation by the user for issuing an instruction to perform photographing, the second executing means 124 photographs the entire document 110 (S8).

In the case where there is any attribute that has been acquired by the first executing means 122 and has not yet been photographed (S9: Yes), that is, in the case where a plurality of attributes have been acquired by the first executing means 122 and first images 110*a* corresponding to all the attributes have not been photographed, the third display control means 125 performs control such that an attribute required to be photographed (that is, an attribute for which a first image 110*a* has not been acquired) and a photographing screen for photographing the first image 110*a* are displayed (S10).

When the receiving means 130 receives an operation for issuing an instruction to perform photographing, the third executing means 126 performs photographing of the attribute (S11).

While there is any attribute that has been acquired by the first executing means 122 and has not yet been photographed (S9: Yes), the fourth executing means 127 repeatedly performs processing of steps S10 and S11.

Then, the fifth executing means 129 uploads the image of the photographed entire document 110 and the first image 110*a* acquired for each attribute (hereinafter, may be referred to as an "image corresponding to an attribute") (S12).

EXAMPLES

Next, six examples (Examples 1 to 6) of the exemplary embodiment described above will be described with reference to FIGS. 6A to 6C, 7A to 7C, 8A to 8B, FIG. 9, FIG. 10, and FIGS. 11A to 11B.

(1) Example 1

FIGS. 6A, 6B, and 6C are diagrams illustrating an example of an operation of the information processing apparatus 1. The operation of the information processing apparatus 1 is performed in the order of FIGS. 6A, 6B, an 6C. Even in the case where the user photographs the first image 110*a* while intending to include only one attribute, the first image 110*a* may include a plurality of attributes. Example 1 illustrates an operation for the case where the first image 110*a* includes a plurality of attributes.

Hereinafter, a diagram corresponding to the top screen 100 illustrated in FIG. 4A is similar to that in the exemplary embodiment described above, and such a diagram will not be provided. Furthermore, elements including the same configurations and functions as those in the exemplary embodiment described above will be referred to with the same reference signs, and detailed explanation for those elements will not be provided. Similar explanations may also be omitted.

As illustrated in FIG. 6A, the second executing means 124 photographs the entire document 110. As illustrated in FIG. 6B, the first image 110*a* includes a plurality of attributes. In FIG. 6B, an example in which the first image 110*a* includes two attributes, "attribute 1" and "attribute 2", while the second guidance information 112 for guiding the user to photograph the "attribute 1" is being displayed is illustrated. However, the number of attributes included in the first image 110*a* is not necessarily two. Three or more attributes may be included in the first image 110*a*.

The third executing means 126 photographs the first image 110*a* in accordance with an operation by the user. In this case, as illustrated in FIG. 6C, the third display control means 125 performs control such that a marking operation screen 101 for allowing the user to perform a marking operation for attaching a mark 114 such as a round mark or a square mark to the attribute in the first image 110a to be acquired is displayed.

The receiving means 130 receives the marking operation performed on the marking operation screen 101 by the user. The third display control means 125 performs control such that the mark 114 is attached and displayed in accordance with the marking operation.

The third executing means 126 performs photographing of a region to which the mark 114 is attached. The fourth executing means 127 controls the third display control means 125 and the third executing means 126 to perform displaying of the marking operation screen 101 and photographing repeatedly in order for all the attributes.

The fifth executing means 129 uploads the series of first images 110a including the regions to which the marks 114 are attached. The server apparatus 3 analyzes the uploaded first images 110a and extracts attribute values. Analyzing an image and extracting an attribute value may be performed by the information processing apparatus 1.

(2) Example 2

Figure 7C:
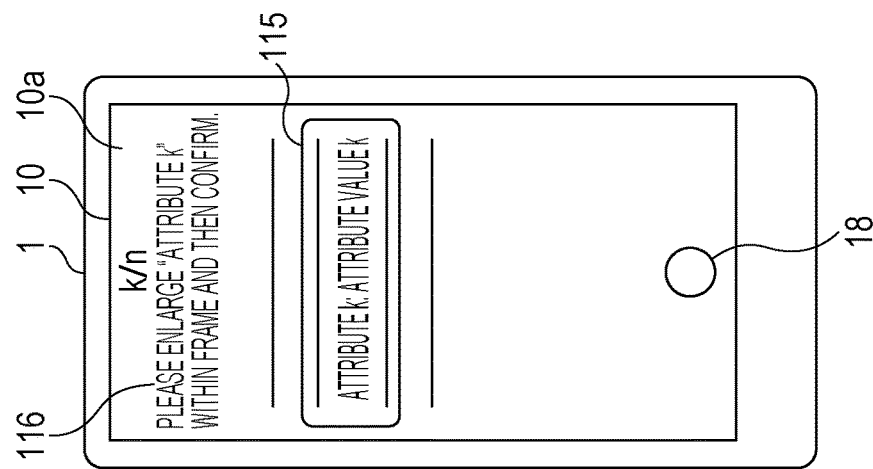
FIGS. 7A to 7C are diagrams illustrating an example of an operation of the information processing apparatus.
Figure 7B:
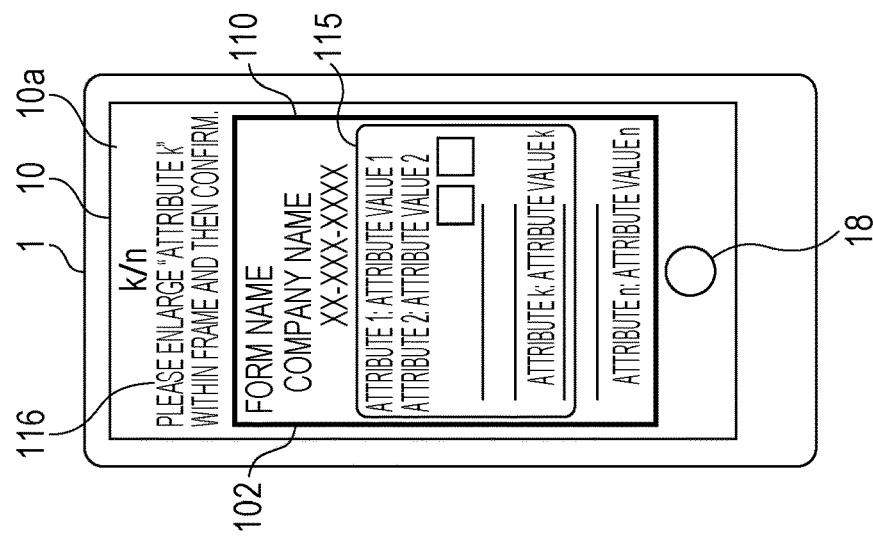
Figure 7A:
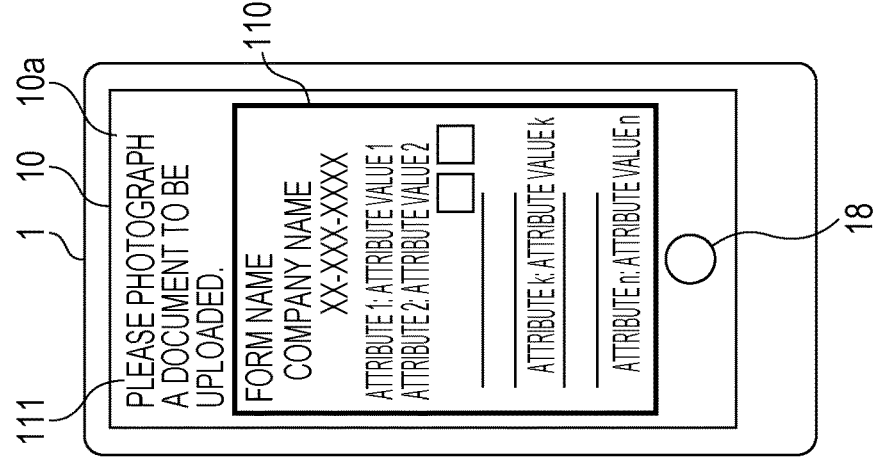

FIGS. 7A, 7B, and 7C are diagrams illustrating an example of an operation of the information processing apparatus 1. The operation of the information processing apparatus 1 is performed in the order of FIGS. 7A, 7B, and 7C. In the exemplary embodiment described above, the first image 110a is photographed in accordance with an operation by the user. However, the first image 110a is not necessarily acquired by photographing. The first image 110a may be acquired by enlarging the entire image on the display surface 10a. Details will be described below.

As illustrated in FIG. 7A, the second executing means 124 photographs the entire document 110. Then, as illustrated in FIG. 7B, the third display control means 125 performs control such that an enlarging operation screen 102 for allowing the user to perform an operation for enlarging the document 110 is displayed. At this time, the third display control means 125 performs control such that a guide frame 115 indicating the position and region of the image of the entire document 110 to be enlarged and displayed is also displayed.

The third display control means 125 performs control such that information (hereinafter, may be referred to as "third guidance information") 116 for guiding the user to enlarge and display a specific attribute, such as "Please enlarge 'attribute k' within the frame and then confirm.", is also displayed. The third guidance information is an example of "first guidance information" in an exemplary embodiment of the present disclosure.

As illustrated in FIG. 7C, the user performs an operation for enlarging the image of the entire document 110 to include "attribute k" to be acquired within the guide frame 115. This operation corresponds to an operation for moving two fingers away from each other (that is, pinch-out). The operation for enlarging the image of the entire document 110 is an example of an "operation for specifying a first region" in an exemplary embodiment of the present disclosure. Pinch-out is an example of an enlarging operation. The guide frame 115 may be displayed in a specific color. The shape of the guide frame 115 is not limited to a specific shape.

The third executing means 126 cuts out and extracts the region of the image of the entire document 110 that is displayed in an enlarged manner. "Cutting out" is an example of "acquisition" in an exemplary embodiment of the present disclosure. In the case where there are a plurality of attributes, the fourth executing means 127 controls the third display control means 125 and the third executing means 126 to display the enlarging operation screen 102 and cut out and extract the enlarged and displayed region repeatedly in order for all the attributes.

The fifth executing means 129 uploads the series of first images 110a including the enlarged and displayed regions. The server apparatus 3 analyzes the uploaded first images 110a and extracts attribute values. Analyzing an image and extracting an attribute value may be performed by the information processing apparatus 1.

(3) Example 3

Figure 8A:
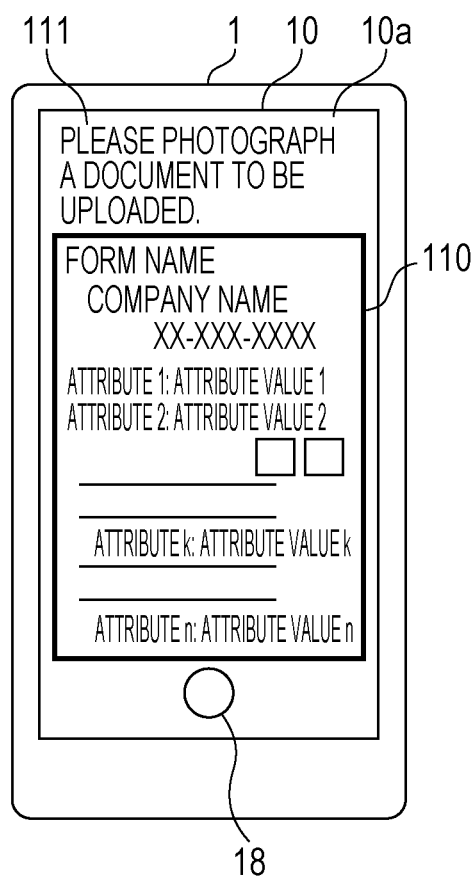
FIGS. 8A and 8B are diagrams illustrating an example of an operation of the information processing apparatus.
Figure 8B:
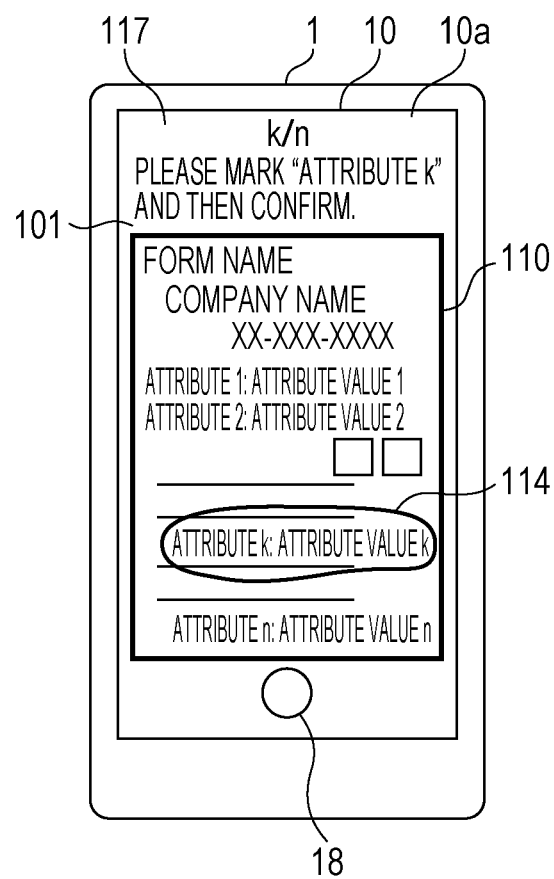

FIGS. 8A and 8B are diagrams illustrating an example of an operation of the information processing apparatus 1. The operation of the information processing apparatus 1 is performed in the order of FIGS. 8A and 8B. In Example 2, the image of the entire document 110 is enlarged and attributes are acquired. However, for acquisition of an attribute, the image of the entire document 110 is not necessarily enlarged. An example will be described below.

As illustrated in FIG. 8A, the second executing means 124 photographs the entire document 110. As illustrated in FIG. 8B, the third display control means 125 performs control such that the marking operation screen 101 is displayed. Furthermore, the third display control means 125 performs control such that information (hereinafter, may be referred to as "fourth guidance information") 117 for guiding the user to mark a specific attribute, such as "Please mark 'attribute k' and then confirm.", is also displayed. The fourth guidance information is an example of "first guidance information" in an exemplary embodiment of the present disclosure.

The receiving means 130 receives a marking operation performed by the user. The third display control means 125 performs control such that the mark 114 is displayed in accordance with the marking operation. The marking operation is an example of an "operation for specifying search information" in an exemplary embodiment of the present disclosure.

The third executing means 126 determines a region of the image of the entire document 110 to which the mark 114 is attached. Determining is an example of "acquisition" in an exemplary embodiment of the present disclosure. In the case where there are a plurality of attributes, the fourth executing means 127 controls the third display control means 125 and the third executing means 126 to display the marking operation screen 101 and determine a region to which the mark 114 is attached repeatedly in order for all the attributes.

The fifth executing means 129 uploads the series of images including the regions to which the marks 114 are attached. The server apparatus 3 analyzes the uploaded first images 110a and extracts attribute values. Analyzing an image and extracting an attribute value may be performed by the information processing apparatus 1.

(4) Example 4

Figure 9:
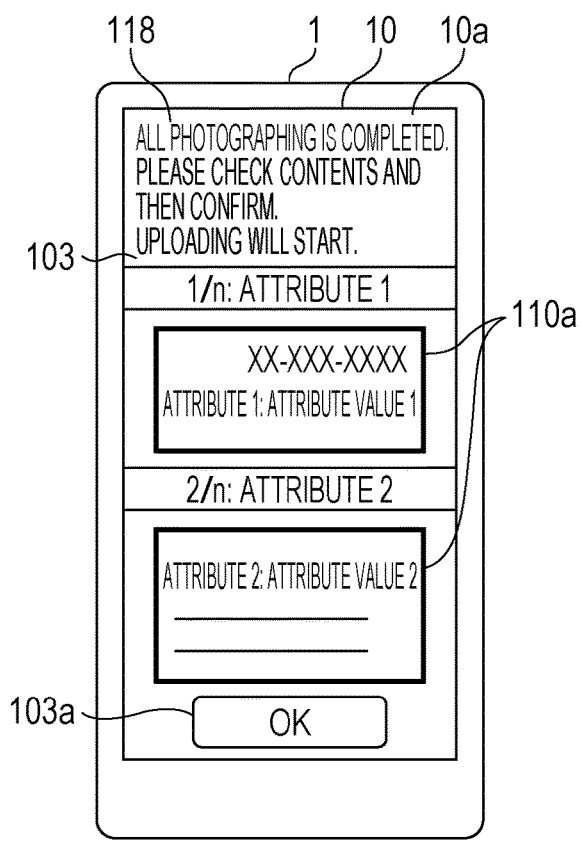
FIG. 9 is a diagram illustrating an example of a list screen.

FIG. 9 is a diagram illustrating an example of a list screen. As illustrated in FIG. 9, when the fifth executing means 129 uploads a plurality of images, the third display control means 125 performs control such that a list screen 103 on which the list of acquired first images 110a is displayed is displayed.

Furthermore, the third display control means 125 performs control such that information (hereinafter, may be referred to as "fifth guidance information") 118 for prompting the user to confirm contents and guiding the user to issue an instruction to perform uploading, such as "All photographing is completed. Please check contents and then confirm.", is displayed. Furthermore, the list screen 103 includes a button ("OK" button) 103a for confirming contents displayed on the list screen 103 and allowing the first image 110a to be uploaded.

In FIG. 9, an example in which only the first images 110a corresponding to "attribute 1" and "attribute 2" are displayed is illustrated. However, all the acquired first images 110a may be displayed together or may be displayed sequentially in accordance with, for example, a flick operation.

(5) Example 5

Figure 10:
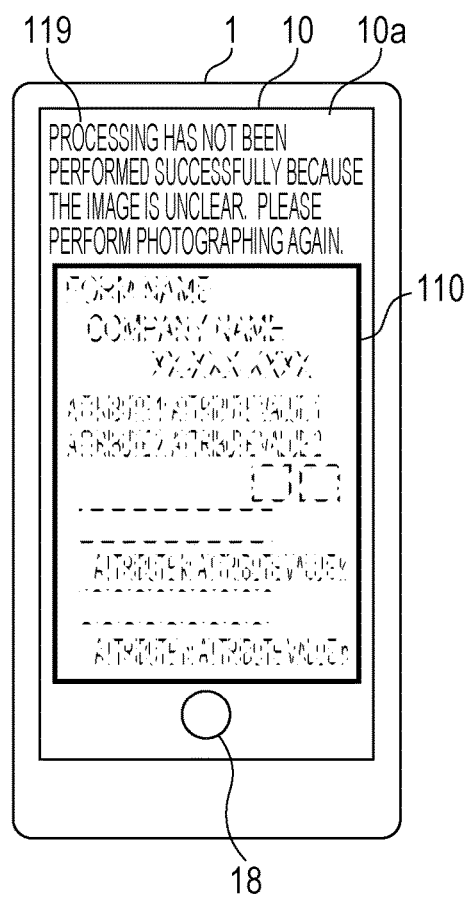
FIG. 10 is a diagram illustrating an example of an operation of the information processing apparatus.

FIG. 10 is a diagram illustrating an example of an operation of the information processing apparatus 1. The information processing apparatus 1 according to Example 5 further includes, in addition to the functions of the information processing apparatus 1 according to the exemplary embodiment described above, an image processing unit that performs image processing such as OCR processing for recognizing characters.

In the case where the image of the entire document 110 is unclear, for example, even if the image is displayed in an enlarged manner and an attribute is specified, the attribute may not be extracted. In such a case, the user may be instructed in advance to perform photographing again. A specific example will be described below.

In the case where the image of the entire document 110 photographed by the second executing means 124 is unclear, the third display control means 125 performs control such that information (hereinafter, may be referred to as "sixth guidance information") 119 for notifying the user of a failure in processing the image and a reason for the failure and guiding the user to perform photographing again, such as "Processing has not been performed successfully because the image is unclear. Please perform photographing again.", is displayed, as illustrated in FIG. 10. The sixth guidance information is an example of "second guidance information" in an exemplary embodiment of the present disclosure.

Specifically, the third display control means 125 may perform processing for displaying the sixth guidance information 119, for example, between steps S8 and S9 in the flowchart illustrated in FIG. 5.

Being "unclear" represents a case where the state of an image acquired by photographing (for example, resolution, focus, contrast, degree of blurring, etc.) does not reach a predetermined reference value. The predetermined reference value may be, for example, determined from the viewpoint of correctly extracting an attribute value by analysis of an image.

(6) Example 6

Figure 11A:
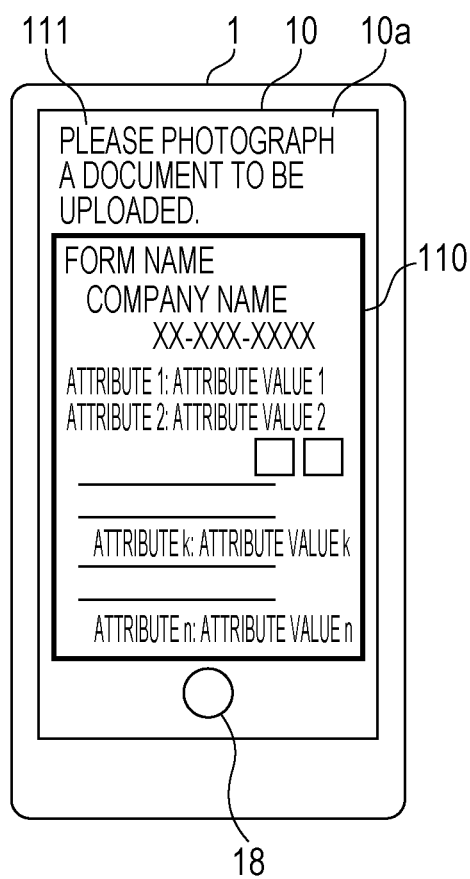
FIGS. 11A and 11B are diagrams illustrating an example of an operation of the information processing apparatus.
Figure 11B:
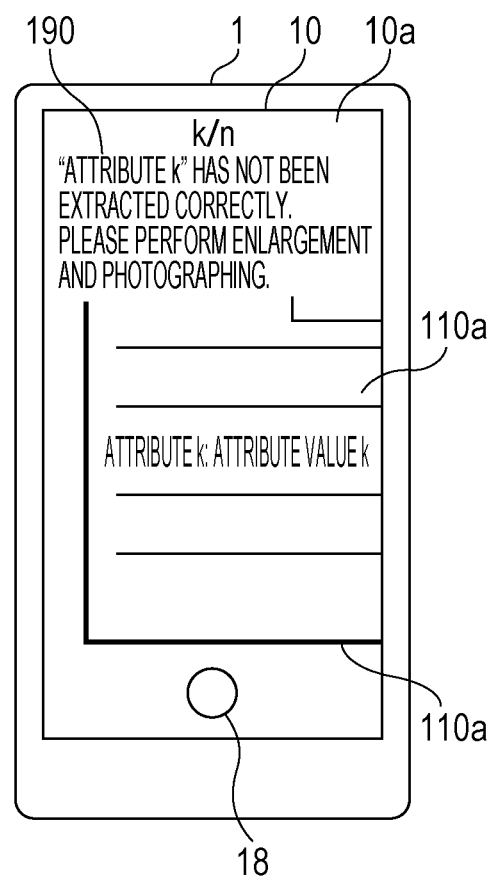

FIGS. 11A and 11B are diagrams illustrating an example of an operation of the information processing apparatus 1. The operation of the information processing apparatus 1 is performed in the order of FIGS. 11A and 11B. As with the information processing apparatus 1 according to Example 5, the information processing apparatus 1 according to Example 6 includes an image processing unit that performs image processing such as OCR processing.

The information processing apparatus 1 may extract, with the image processing function mentioned above, a plurality of attributes associated with the type of the document from the image of the entire document 110. In a specific case, such as a case where a plurality of similar attributes are extracted and an attribute is not able to be identified from among the plurality of attributes or a case where an attribute is not able to be extracted using the image processing function, the user may be guided to perform enlargement photographing or to issue an instruction to provide a mark. Details will be described below.

As illustrated in FIG. 11A, the second executing means 124 photographs the entire document 110. Then, the information processing apparatus 1 analyzes, using the image processing function, the image of the photographed entire document 110. In the specific case described above, the third display control means 125 performs control such that information (hereinafter, may be referred to as "seventh guidance information") 190 for notifying the user of a failure in extracting an attribute and guiding the user to enlarge and photograph the attribute that has not been extracted correctly, such as "'Attribute k' has not been extracted correctly. Please perform enlargement and photographing.", is displayed, as illustrated in FIG. 11B. The seventh guidance information is an example of "third guidance information" in an exemplary embodiment of the present disclosure.

The third display control means 125 may display information (hereinafter, may be referred to as "eighth guidance information") for guiding the user to mark a target attribute or information for guiding the user to input a specified image for clearly indicating a target attribute, in place of the seventh guidance information. The eighth guidance information is an example of "third guidance information" in an exemplary embodiment of the present disclosure.

Exemplary embodiments of the present disclosure have been described above. However, exemplary embodiments of the present disclosure are not limited to the exemplary embodiments described above. Various changes and implementations may be made without departing from the scope of the present disclosure.

The means of the processor 12a may be partially or entirely configured as a hardware circuit such as a field programmable gate array (FPGA) or an application specific integrated circuit (ASIC).

Furthermore, part of components in the exemplary embodiments described above may be omitted or changed. In the flow of a process in the exemplary embodiments of the present disclosure, addition, deletion, change, exchange, and the like of steps may be performed without departing from the scope of the present disclosure. A program used in the exemplary embodiments may be recorded in a computer-readable recording medium such as a compact disc-read only memory (CD-ROM) and provided. The program may be stored in an external server such as a cloud server and used via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
receive type information indicating a type of a document;
specify an item of a document associated with the type information; and
output a message for a user to take a document image of the document, the document image including at least the item and a vicinity of the item.

2. The information processing apparatus according to claim 1,
wherein the processor is configured to:
receive an operation for specifying the item on the document image, and
specify the item in accordance with the operation.

3. The information processing apparatus according to claim 2, wherein the processor is configured to:
acquire a target image including an entirety of the document,
receive an enlarging operation for enlarging and displaying the target image, and
acquire the image displayed in accordance with the enlarging operation as the document image.

4. The information processing apparatus according to claim 3, wherein the processor is configured to:
in a case where a plurality of document images are acquired, perform control such that the plurality of document images are displayed as a list.

5. The information processing apparatus according to claim 4, wherein the processor is configured to:
in response to a determination that the document image is unclear, output second guidance information for providing a guidance to photograph the document again.

6. The information processing apparatus according to claim 3, wherein the processor is configured to:
in response to a determination that the document image is unclear, output second guidance information for providing a guidance to photograph the document again.

7. The information processing apparatus according to claim 2, wherein the processor is configured to:
in a case where a plurality of document images are acquired, perform control such that the plurality of document images are displayed as a list.

8. The information processing apparatus according to claim 7, wherein the processor is configured to:
in response to a determination that the document image is unclear, output second guidance information for providing a guidance to photograph the document again.

9. The information processing apparatus according to claim 2, wherein the processor is configured to:
in response to a determination that the document image is unclear, output second guidance information for providing a guidance to photograph the document again.

10. The information processing apparatus according to claim 2, wherein the processor is configured to:
acquire a target image including an entirety of the document, and
output, in a case where a plurality of pieces of search information are extracted from the target image, third guidance information for providing a guidance to acquire the document image or specify one of the plurality of pieces of search information.

11. The information processing apparatus according to claim 1, wherein the processor is configured to:
acquire a target image including an entirety of the document,
receive an enlarging operation for enlarging and displaying the target image, and
acquire an image displayed in accordance with the enlarging operation as the document image.

12. The information processing apparatus according to claim 11, wherein the processor is configured to:
in a case where a plurality of document images are acquired, perform control such that the plurality of document images are displayed as a list.

13. The information processing apparatus according to claim 11, wherein the processor is configured to:
in response to a determination that the document image is unclear, output second guidance information for providing a guidance to photograph the document again.

14. The information processing apparatus according to claim 11, wherein the processor is configured to:
acquire a target image including an entirety of the document, and
output, in a case where a plurality of pieces of search information are extracted from the target image, third guidance information for providing a guidance to acquire the document image or specify one of the plurality of pieces of search information.

15. The information processing apparatus according to claim 12, wherein the processor is configured to:
in response to a determination that the document image is unclear, output second guidance information for providing a guidance to photograph the document again.

16. The information processing apparatus according to claim 1, wherein the processor is configured to:
in a case where a plurality of document images are acquired, perform control such that the plurality of document images are displayed as a list.

17. The information processing apparatus according to claim 16, wherein the processor is configured to:
in response to a determination that the document image is unclear, output second guidance information for providing a guidance to photograph the document again.

18. The information processing apparatus according to claim 1, wherein the processor is configured to:
in response to a determination that the document image is unclear, output second guidance information for providing a guidance to photograph the document again.

19. The information processing apparatus according to claim 1, wherein the processor is configured to:
acquire a target image including an entirety of the document, and
output, in a case where a plurality of pieces of search information are extracted from the target image, third guidance information for providing a guidance to acquire the document image or specify one of the plurality of pieces of search information.

20. A non-transitory computer readable medium storing a program causing a computer to execute a process for information processing, the process comprising:

receiving type information indicating a type of a document;
specifying an item of a document associated with the type information; and
outputting a message for a user to take a document image of the document, the document image including at least the item and a vicinity of the item.

\* \* \* \* \*